(12) United States Patent
Hart (10) Patent No.: US 7,753,070 B2
(45) Date of Patent: Jul. 13, 2010

(54) INSERTABLE COMPONENT WHICH CAN BE INSERTED INTO A GAS OR LIQUID LINE

(75) Inventor: Keith Hart, Welland (GB)

(73) Assignee: Neoperl GmbH, Mullheim (DE)

( * ) Notice: Subject to any disclaimer, the term of this patent is extended or adjusted under 35 U.S.C. 154(b) by 1043 days.

(21) Appl. No.: 10/548,311

(22) PCT Filed: Mar. 11, 2004

(86) PCT No.: PCT/EP2004/002507

§ 371 (c)(1),
(2), (4) Date: Sep. 7, 2005

(87) PCT Pub. No.: WO2004/083699

PCT Pub. Date: Sep. 30, 2004

(65) Prior Publication Data

US 2006/0169330 A1  Aug. 3, 2006

(30) Foreign Application Priority Data

Mar. 15, 2003 (DE) ................................ 103 11 501

(51) Int. Cl.
*F16K 15/14* (2006.01)
*G05D 7/01* (2006.01)
(52) U.S. Cl. ............... 137/512.15; 137/517; 138/46
(58) Field of Classification Search ........... 137/512.1, 137/512.15, 852, 854, 517, 518; 138/46
See application file for complete search history.

(56) References Cited

U.S. PATENT DOCUMENTS

| | | | | |
|---|---|---|---|---|
| 106,433 A | * | 8/1870 | Van Keuren | 137/512.15 |
| 1,408,724 A | * | 3/1922 | Decrow | 137/512.15 |
| 2,777,464 A | * | 1/1957 | Mosely | 138/46 |
| 2,781,059 A | * | 2/1957 | Frey | 138/46 |
| 2,859,771 A | * | 11/1958 | Blagg | 137/512.15 |
| 2,910,093 A | * | 10/1959 | Dahl | 138/46 |
| 2,948,296 A | * | 8/1960 | Thorburn | 138/46 |
| 2,960,109 A | * | 11/1960 | Wilson | 137/517 |
| 3,022,796 A | * | 2/1962 | Cummings | 137/512.15 |
| 3,409,050 A | * | 11/1968 | Weese | 137/517 |
| 3,448,766 A | * | 6/1969 | Schule | 137/854 |
| 3,646,956 A | | 3/1972 | Rogers | |
| 3,827,456 A | | 8/1974 | Sheppard | |
| 3,847,178 A | * | 11/1974 | Keppel | 138/46 |

(Continued)

FOREIGN PATENT DOCUMENTS

DE  1 154 982  9/1963

(Continued)

*Primary Examiner*—John Rivell
(74) *Attorney, Agent, or Firm*—Volpe and Koenig, P.C.

(57) ABSTRACT

An insertable component that is embodied as a non-return element and/or as a through-flow regulator is provided which can be inserted into a gas or liquid line. The insertable component (1) includes a housing (2) formed of at least two housing parts (3, 4). A housing seal (5) is located between the housing parts (3, 4). The housing seal is joined as a single piece to an annular membrane (11), which is used as a closing body for the non-return element, and/or a regulating or throttle body. The insertable component includes a small number of individual parts and is characterized by a compact structure and low production costs.

19 Claims, 6 Drawing Sheets

U.S. PATENT DOCUMENTS

| | | | |
|---|---|---|---|
| 3,939,868 A * | 2/1976 | Logsdon | 138/46 |
| 4,000,857 A * | 1/1977 | Moen | 138/46 |
| 4,117,856 A | 10/1978 | Carlson | |
| 4,976,283 A * | 12/1990 | Wildfang et al. | 138/46 |
| 5,305,795 A | 4/1994 | Forberg | |
| 5,743,291 A * | 4/1998 | Nehm et al. | 138/46 |
| 6,571,831 B1 * | 6/2003 | Hart | 138/46 |
| 6,695,011 B2 * | 2/2004 | Sochtig | 138/46 |
| 7,392,828 B2 * | 7/2008 | Hart et al. | 137/512.15 |
| 7,527,075 B2 * | 5/2009 | Zoller | 138/46 |
| 7,594,519 B2 * | 9/2009 | Hart et al. | 138/46 |

FOREIGN PATENT DOCUMENTS

| | | |
|---|---|---|
| DE | 2 230 642 | 12/1972 |
| DE | 78 12 642 | 8/1978 |
| DE | 40 33 925 | 5/1991 |
| DE | 198 37 694 | 2/2000 |
| WO | WO 0104714 A1 * | 1/2001 |

* cited by examiner

INSERTABLE COMPONENT WHICH CAN BE INSERTED INTO A GAS OR LIQUID LINE

BACKGROUND

The invention relates to an insertable component, which is embodied as a non-return element and which can be inserted into a gas or liquid line, having a housing with at least one closing body being displaceably arranged inside the housing, that seals a through-flow opening or several through-flow openings of feeder channels in the closed position.

The invention also relates to an insertable component, which is embodied as a through-flow regulator and which can be inserted into a gas or liquid line, having a housing with at least one throttle body or regulating body being arranged inside said housing, limiting a regulating gap between itself and a housing wall, with the gap changing depending on pressure.

It is commonly known to combine several sanitary components into a single sanitary insertable unit, particularly some that serve various functions. From DE 297 03 335 U1 by the applicant, a backflow preventer has been known, which represents a component of an insertable sanitary unit in addition to comprising an upstream sieve for contaminants and a downstream through-flow regulator. Such sanitary insertable units are inserted for example at the cold water and warm water inlet in thermostat-controlled mixing faucets, in order to prevent, with the help of the non-return unit, the entry of cold water into the warm water pipe and vice versa and in order to ensure an even water flow, using the through-flow regulator, even in varying liquid pressures of the inflowing water.

The previously known backflow preventer comprises a housing with a cone-shaped valve arranged therein. The cone-shaped valve cooperates with the valve seat, which is molded inside the housing. The cone-shaped valve can be displaced from a closed position into an open position by the pressure of the inflowing water against the returning force of a pressure spring. In an opposite flow, the cone-shaped valve is displaced inside the housing towards the valve seat and the return preventor is closed to prevent any undesired return flow.

The through-flow regulator provided in the sanitary insertable unit according to DE 297 03 335 U1 and positioned downstream the above-described through-flow regulator comprises a control core, conically tapering in the through-flow direction, which cooperates with a rubber ring that can be widened depending on water pressure.

The previously known sanitary insertable unit and, in particular, the insertable components contained therein are multipart and correspondingly expensive in their production. Due to the fact that the insertable components serving various functions are positioned downstream of one another in the through-flow direction, the insertable sanitary unit of prior art comprises a comparatively large construction length, which can be further extended by additional insertable components added upstream or downstream.

SUMMARY

Therefore, the object is particularly to provide insertable components of the type mentioned at the outset that can be inserted into gas or liquid lines, which can be produced with comparatively little expense and which are designed simple and compact.

In the insertable component according to the invention, embodied as a backflow preventer, the solution comprises for the housing to be made from at least two housing parts and being provided with feeder channels in at least one annular area, which open into a housing chamber, and that a housing seal is provided between facing sides of two adjacent housing parts, the housing seal is connected in one piece to an annular membrane, which can be displaced by the flow medium, inside the housing chamber, and forms a closing body.

The insertable component according to the invention, embodied as a non-return element, is provided with a housing which is formed by at least two preferably coaxial housing parts. A housing part seal is held between these housing parts, connected in one piece to at least one annular membrane, which can be displaced by the flow medium, inside a housing chamber. When return flow occurs, at least one annular membrane forming a closing body seals the through-flow opening of the feeder channels, which are arranged in at least one annular area inside the housing of the outer housing. However, with a liquid flow, flowing in the normal through-flow direction, the at least one annular membrane is displaced from the closing position into the open position, in which the through-flow openings remain open. The non-return element according to the invention can thus be combined from as little as three parts, namely the two housing parts and the single part combining the annular membrane and the housing seal. The non-return element according to the invention can therefore be produced easily and in a compact size.

A particularly simple embodiment of the insertable component embodied as a non-return element provides for the housing seal and the at least one annular membrane, forming the closing body, to be embodied as a flat body. In the insertable component according to the invention the housing seal and the at least one annular membrane, forming the closing body, can be embodied as a one-piece flat body and do not require any complicated design.

The solution provides for the insertable component embodied as a through-flow regulator according to the invention, that the housing is made from at least two housing parts and that between the facing sides of two adjacent housing parts, a housing seal is provided, which is connected in one piece to the at least one throttle body located inside the housing.

The insertable component, embodied as a through-flow regulator, comprises a housing, which is composed of at least two preferably coaxial housing parts. A housing seal is held between these housing parts, connected in one piece to the at least one throttle body located inside the housing. This at least one throttle body limits a control gap between itself and a housing wall, which gap changes depending on pressure. In this way, the insertable component embodied as a through-flow regulator can be composed inexpensively from only three individual components.

In order to securely fasten the housing seal and the annular membrane connected thereto and/or the throttle body to the inside of the housing in a simple manner, it is advantageous for the housing parts to be provided with annular flat surfaces, facing one another, between which the housing seal can be mounted.

In order to further facilitate the production of the insertable components according to the invention it is advantageous for the at least two housing parts to be provided with snap elements for connecting the housing parts, engaging one another in the mounted position. This way, a complicated screw connection, gluing, or welding can be omitted for the assembly of the exterior housing formed by the housing parts.

A particularly easy to assembly embodiment according to the invention provides for the snap elements of one of the housing parts to comprise a central opening and for the other housing part to preferably comprise several engaging hook elements.

The insertable component according to the invention can be easily disassembled, if necessary, when the hook elements of the one housing component penetrate the other housing component in the assembled position and extend beyond its exterior.

A preferred embodiment according to the invention provides for the facial areas clamping the housing seal to be located at the exterior rim of the housing parts. The rim position of the clamping area of the housing seal allows for a comparatively large functional area inside the housing for annular membranes and/or throttle bodies.

The small number of parts of the insertable component according to the invention is enhanced even more when the internal surface of the housing part arranged in the flow direction extends beyond the clamping area of the housing seal towards the inside and forms a section of the housing chamber wall, and where one or several feeder channels open. The through openings of these feeder channels can be arranged in several, particularly concentric annular areas of the housing. However, it is particularly advantageous for several feeder channels to be arranged on an annular part of the housing, distributed in the circumferential direction, which preferably open immediately adjacent to the clamping area of the region of the annular membrane that forms the housing seal.

The insertable component embodied as a non-return element reacts particularly quickly to small return flows when the annular membrane is extended inwardly beyond a region internally adjacent to the housing seal, forming the closing body, and thus forms a separating wall in the open or through-flow position, dividing the housing chamber into two partial annular chambers, and in this position contacts with its free interior annular rim the housing part at the downstream side, when a penetrating and/or through-flow opening follows to the upstream partial annular chamber and when at least one non-return opening opens into the downstream partial chamber.

In order to fasten the throttle body in its control position it is advantageous for the throttle body to be fastened in a housing chamber between the upstream and the downstream housing part and for the downstream housing part to comprise a downstream rest and an exterior support and for the upstream housing part to comprise an interior housing wall or a similar rest, forming the limit of the control gap, for the annular throttle body.

A particularly advantageous further development according to the invention, which independent protection is claimed, provides for the insertable component according to the invention to be embodied as a non-return element and as a through-flow regulator.

Here it can be advantageous for the annular membrane to be embodied as a closing body adjacent to the housing seal and to be connected to the throttle body in one piece at its interior end. This further developed embodiment, which can also be made from as little as three individual parts, is embodied both as a non-return element as well as a through-flow regulator. Here, the closing body required for the non-return element and the throttle body required for the through-flow regulator are connected in one piece to the housing seal. Such an embodiment is particularly compact and is characterized in a low construction height, as well.

The small number of parts of the insertable component according to the invention is even further enhanced in its high functionality when it is embodied for the insertion into a liquid line and comprises an annular seal at an exterior thereof for sealing the liquid line, and when the annular seal is connected in one piece to the housing seal between the facing sides of the housing component.

Here, it is particularly advantageous for the exterior annular seal to be embodied as an O-ring seal or an annular cord seal.

In order to fasten the annular seal to the exterior of the housing it is advantageous for an annular groove to be provided on the outside between the two adjacent housing parts for accepting the exterior annular seal and for the annular groove to be formed by a housing recess in one housing part, open towards the separation point of the housing for forming a side wall and the bottom of the groove, and for the interior facing surface of the other housing part to form the second side wall.

Another preferred embodiment, worth protecting in itself, relates to an insertable component embodied as a through-flow regulator, which can maintain the constant through-flow of fluid under a wide range of pressures, from 0.1 bar to 10 bar, for example.

Previous embodiments of sanitary through-flow regulators have their respective strengths in certain pressure zones. For example, through-flow regulators have been known which achieve a characteristic through-flow at very high pressures, however they have problems to stabilize the target line in the medium and strong pressure ranges. The separating line drifts upward or downward or it shows oscillating phenomenon. Other known embodiments of throughflow-regulators, operating very well in medium to high pressure ranges, use an O-ring which counteracts a control profile. However, at very low differential pressures of 0.1 bar, for example, the O-ring does not react to the pressure difference, the through-flow results entirely from the available cross-section. Due to the fact that the O-ring only reacts at a relatively high pressure, the free cross-section cannot be selected too large because otherwise the through-flow becomes too large in the reaction range and an undesired exceeding of the characteristic line occurs. Therefore, through-flow regulators of this type only achieve their respective targeted through-flow at approx. 0.7 to 1.0 bar. A similar embodiment of this class of through-flow regulators is the elastomer disc, which is supported with its flat bottom on a support profile.

A further development according to the invention provides for the housing seal at both sides to be connected in one piece to at least one throttle body each, which throttle body being supported on the inside of the housing in a control gap. Here, it is particularly advantageous for the throttle body provided at both sides of the housing seal to react at different differential pressures, and for a first throttle body preferably to react in a low-pressure range and, in contrast thereto, a second throttle body in a high-pressure range.

The housing seal in this embodiment according to the invention is therefore connected in one piece at both sides to a throttle body each. The throttle bodies react with different sensitivities and thus they can control the through-flow amount in various pressure ranges such that they complement each other, particularly in the low-pressure and the high-pressure range. While the highly sensitive throttle body already diminishes the free cross-section of the flow of the control gap at a low differential pressure of 0.1 bar, for example, the throttle body reacting to high differential pressure deforms not until a further increased pressure and thus keeps the through-flow constant in the high pressure range. The characteristic line of such a regulator achieves the targeted through-flow at very low pressures and maintains it at a constant levels up to a high pressure range of approximately 10 bar, for example.

It can be useful for the insertable component embodied as a non-return element and/or a through-flow regulator to be provided with at least one throttle body or regulating body designed in a lip-shaped manner. However, it is also possible for the insertable component to additionally or instead comprise a throttle body designed as at least one O-ring.

In order for the lip-shaped throttle body to be able to react sensitively to a differential pressure it is useful for at least one lip-shaped throttle body with its free lip end region to be aligned preferably diagonally opposite the through-flow direction.

In order to abruptly increase the resistance of the throttle body, beginning at a predetermined rate of deformation, one embodiment according to the invention provides for the control movement of at least one lip-shaped throttle body to be limited by a control stop.

By arranging this control stop and by providing an appropriate distance of the control stop and the throttle body arranged upstream therefrom the differential pressure can be varied by the design, at which the respective throttle body is to react. Additionally or instead thereof it can also be provided for the throttle bodies, arranged at both sides of the housing seal, to be designed differently, each adjusted to their reactive pressure.

For example it is possible, on the one hand, that the housing seal is connected to a lip-shaped throttle body and, on the other hand, to a throttle body embodied as an O-ring. While the comparatively soft, lip-shaped throttle body already reacts to low differential pressures, an appropriately stiff throttle body, embodied as an O-ring, can be characterized by a high reaction pressure, in reference thereto. However, it is also possible for the housing seal to be connected at both sides with lip-shaped or with O-ring shaped throttle bodies, which become active at different pressure ranges based on their design and dimensions.

Therefore, another embodiment according to the invention provides for the housing seal to be connected at both sides each with a lip-shaped throttle body.

The reaction behavior of the through-flow regulator according to the invention can also be influenced such that the throttle body reacting in the low-pressure range is allocated to the interior or exterior control gap, because the throttle body effective in the exterior control gap seals a larger area during its deformation radially outward than the lip of the throttle body located inside the control gap.

A further development of the invention provides for the housing seal and the throttle bodies connected thereto to be formed as a multi-component die-cast part and for the throttle bodies to be comprised of various elastomers.

In order to enhance an easy reaction of the throttle body of the insertable component embodied as a through-flow regulator and in order to be able to predetermine said through-flow regulator to a fixed maximum amount of flow it is advantageous for the housing wall limiting the control gap to be provided with rib-shaped, grooved, or similarly embodied regulating profiling aligned approximately in the through-flow direction.

BRIEF DESCRIPTION OF THE DRAWINGS

Additionally embodiments of the invention are described in the sub claims. In the following, the invention and its essential details are explained further with the drawings.

Shown are.

DETAILED DESCRIPTION OF THE PREFERRED EMBODIMENTS

Figure 1:
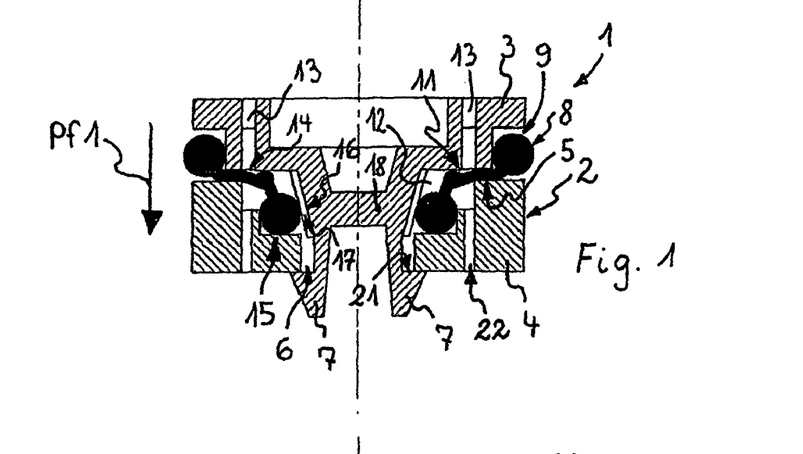
FIG. 1 an insertable component embodied as a non-return element and as a through-flow regulator, that can be inserted into a gas or liquid line, shown in a longitudinal cross-section, FIG. 2 an insertable component embodied only as a non-return element, shown in a longitudinal cross-section, FIG. 3 a downstream facing surface of an insertable component according to FIGS. 1 or 2, FIG. 4 an insertable component embodied as a through-flow regulator and shown in a longitudinal cross-section, with its two housing parts having a housing seal clamped therebetween, whose parts are each connected in one piece at both sides with a throttle-body, lip-shaped and supported in a control gap, FIG. 5 a through-flow regulator according to FIG. 4 in a top view, FIG. 6 a through-flow regulator comparable to FIGS. 4 and 5, however with the housing seal being connected to a throttle body embodied as an O-ring in the area of the interior control gap and a lip-shaped throttle body in the area of the exterior control gap, FIG. 7 a through-flow regulator also comparable to the FIGS. 4 and 5, with its housing seal being connected to two lip-shaped throttle bodies, which react to different differential pressures and have different geometrical shapes for this purpose, and FIG. 8 a through-flow regulator comparable to the one in FIG. 6, however with the O-ring shaped throttle body arranged in the area of the exterior control gap and the lip-shaped throttle body in the area of the interior control gap.
Figure 2:
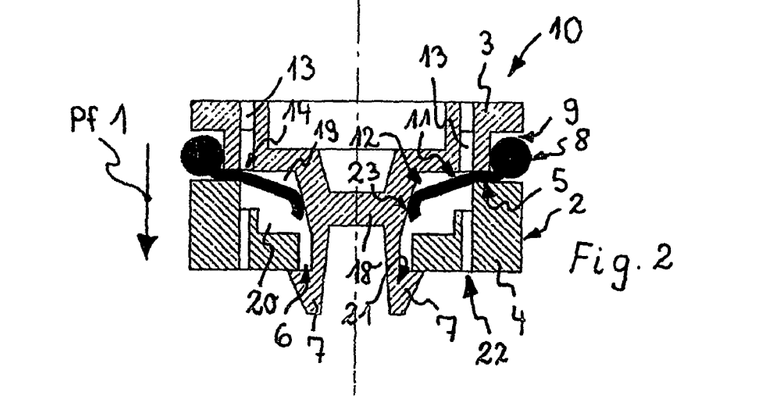
Figure 3:
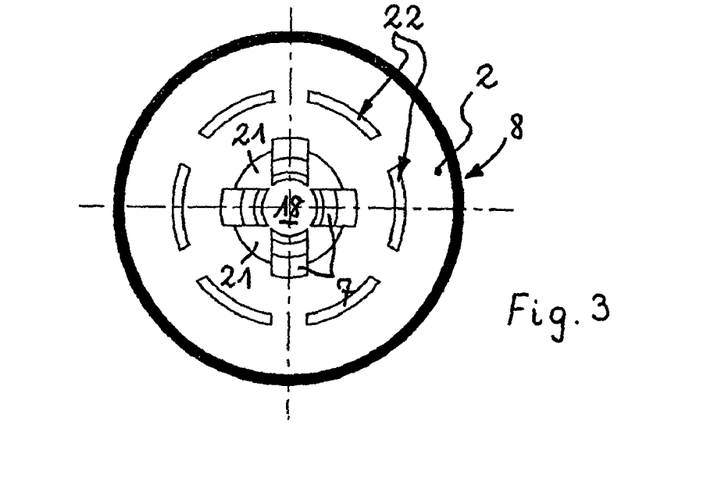

A sanitary insertable component, which can be inserted into a gas or liquid line, is shown in FIGS. 1 and 2 in different embodiments 1, 10. While the insertable component 10 in FIG. 2 is to serve merely as a non-return element, the insertable component 1 in FIG. 1 is integrated both as a non-return element as well as a through-flow regulator.

The exterior housing 2 of the insertable components 1, 10 is formed from two coaxial housing parts 3, 4, having sides that face one another between which a housing seal 5 is held. The housing parts 3, 4 are connected to one another via snap elements which engage in the mounted position. For this purpose, the downstream housing part 4 is provided with a central opening 6, with 4 hook elements 7, pointing crosswise away from one another, and engaging the upstream housing part 3. These hook elements 7 extend beyond the downstream exterior face of the housing 2.

The insertable component 1, 10, can be inserted into a liquid line. In order to seal the interior circumference of the liquid line, an annular seal 8 is provided, which is connected in one piece to the housing seal 5. This annular seal 8, embodied as an annular cord seal, is held in an annular groove 9, which is provided on the outside between the two housing parts 3, 4 for accepting the annular seal 8.

The annular groove 9 is limited by a housing recess, open towards the separating point of the exterior housing 2, at the upstream housing part 3, which housing recess forms a side wall and the groove base. However, the interior surface of the other housing part 4 forms the other side wall of the annular groove 9.

The two housing parts 3, 4 are provided at their exterior edges with annular surfaces, facing one another, between which the housing seal 5 is clamped. The housing seal 5, at the side facing away from the annular seal 8, is connected in one piece to an annular membrane 11, which can be displaced inside a housing chamber 12 by the flow medium and which is embodied as a closing body of the non-return element.

Starting at the upstream surface of the exterior housing 2, several feeder channels 13 lead through the housing part 3, lead with their through openings 14 into the housing chamber 12 at a distance from one another in the circumferential direction. While the annular membrane 11 is displaced by a flow of liquid flowing in the usual through-flow direction Pf1 in its open position, it is held in its closing position during a back flow, opposite the through-flow direction Pf1, which seals the downstream mouths of the through openings 14 with the annular membrane 11.

The annular membrane 11 of the insertable component 1 shown in FIG. 1 is connected in one piece to a throttle body or control body 15 of the through-flow regulator with its interior end, facing away from the seals 5, 8. The throttle body 15, also located in the housing chamber 12 inside the housing of the exterior housing 2, limits a control gap 17 between itself and the housing wall 16, with the gap changing depending on pressure. The throttle body 15 is embodied in the shape of an O-ring and mounted between the upstream and the downstream housing part 3, 4 inside the housing chamber 12.

While the downstream housing part 4 forms a downstream rest and an exterior support for the throttle body 15, the upstream housing part 3 is provided with a central housing or control core, tapering in the through-flow direction Pf1, which forms the housing wall 16 serving as a control gap limit for the annular throttle body 15 and having hook elements 7 protruding from the face of its free end.

In the insertable component 10 according to FIG. 2, the housing seal 5, connected to the annular seal 8, and the annular membrane 11, adjacent towards the inside and serving as a closing body of the non-return element, are provided as flat bodies. Here, the annular membrane 11 is extended inwardly beyond an area adjacent to the housing seal 5, provided as a closing body, and forms in the open position a separating wall, dividing the housing chamber 12 into two partial annular chambers 19, 20, with not only the through openings 14 of the feeder channels 13 leading into the upstream partial annular chamber 19 but also the downstream openings 21, which remain in the central opening 6 between the hook elements 7. However, several return flow openings 22 open into the downstream partial annular space 20, which guide the return flow into the partial annular space 20 affecting the downstream surface of the exterior housing 2, with the return flow in the closed position pressing the annular membrane 11 against the through openings 14 and/or the rounded or curved interior annular rim 23 against the central housing core 18.

The reaction pressure and the reaction behavior of the closing and/or the throttle body can be determined depending on the rubber-elastic characteristics of the material used, for example, the shore-hardness.

Furthermore, the reaction pressure and the reaction speed, particularly of the function of the non-return element, can be modified by the selection of the radial pre-tension of the annular membrane 11.

Various embodiments 100, 101, 102, and 103 of an insertable component provided as a through-flow regulator are shown in FIGS. 4 through 8. The housing 2 of insertable components 100, 101, 102, and 103, insertable in a gas or liquid line, is also provided with two housing parts 3, 4, which clamp a housing seal 5 between one another. The housing seal 5 is connected in one piece on both sides with one throttle body 15, 15' each. Each of these throttle bodies 15, 15' is supported in a control gap 17, 17', respectively, on the inside of the housing 2.

As is discernible from the longitudinal cross-sections in FIGS. 4, 6, 7, and 8, the housing parts 3, 4 are each provided with at least two concentric annular housing walls 24, 25, and 26 and/or 24', 25', and 26', which are connected to one another via radial connection bars 27 in the form of spokes. The annular walls 24/24', 25/25', and 26/26' are allocated in pairs towards one another, with the two central facial walls 25/25' of said housing parts 3, 4 clamping the housing seal 5 between their facial surfaces facing one another and separating the parallel control gaps 17, 17' from one another.

At the sides of the adjacent annular walls 24/25' and/or 26/26', facing the central annular walls 25/25', a control profiling 28, 28' is provided each aligned in a through-flow direction, which is formed here by grooves or bars distributed in the circumferential direction. Here, the throttle bodies 15, 15' can be provided at the housing parts 3, 4 with control profiling 28, 28' embodied differently.

The throttle bodies 15, 15' provided on both sides of the housing seal 5 react at different differential pressures. While a first throttle body 15 preferably reacts in the low pressure range, a second throttle body 15' reacts in the high pressure range, in contrast thereto. In order to ensure a different reaction of the throttle bodies 15, 15', the throttle bodies 15, 15' are provided with different shapes adjusted to their pressure, for example, as shown in the insertable components 100, 101, 102, and 103.

Figure 4:
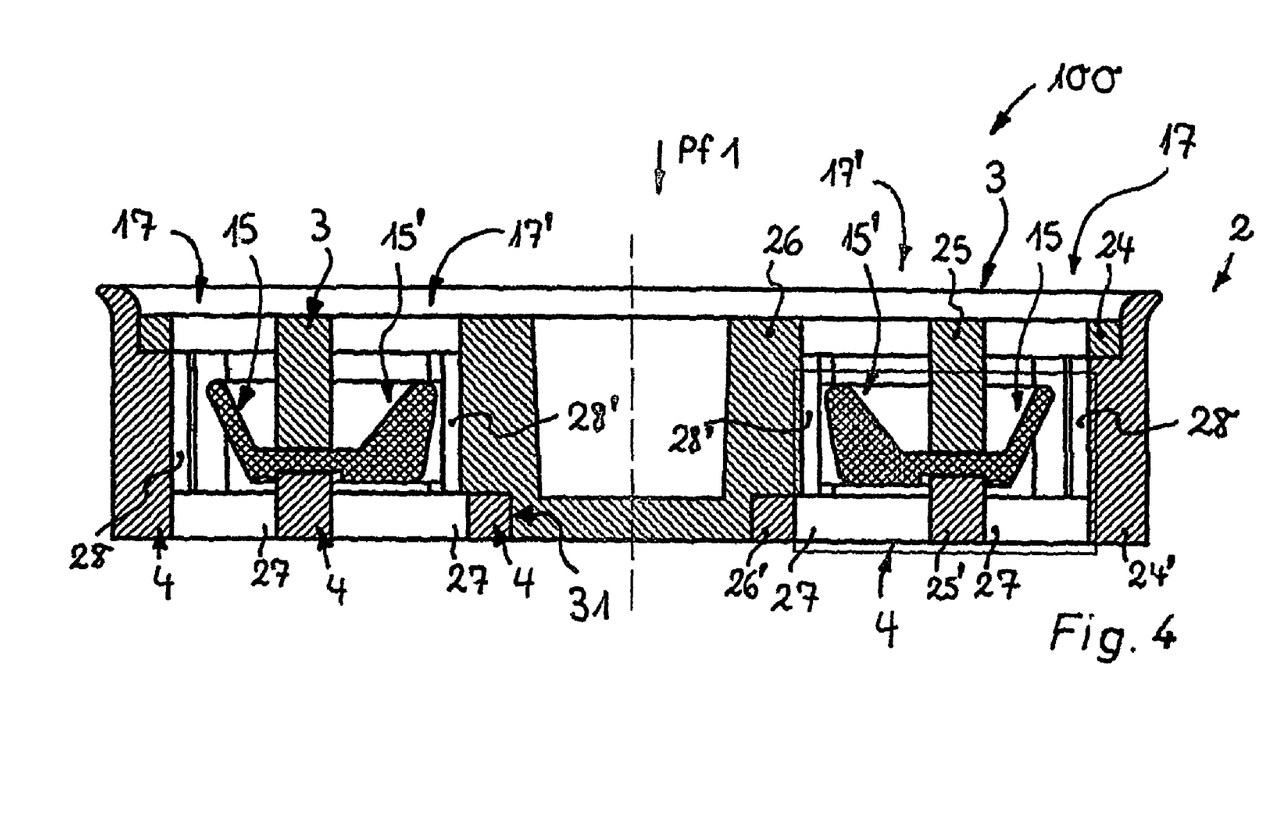
Figure 7:
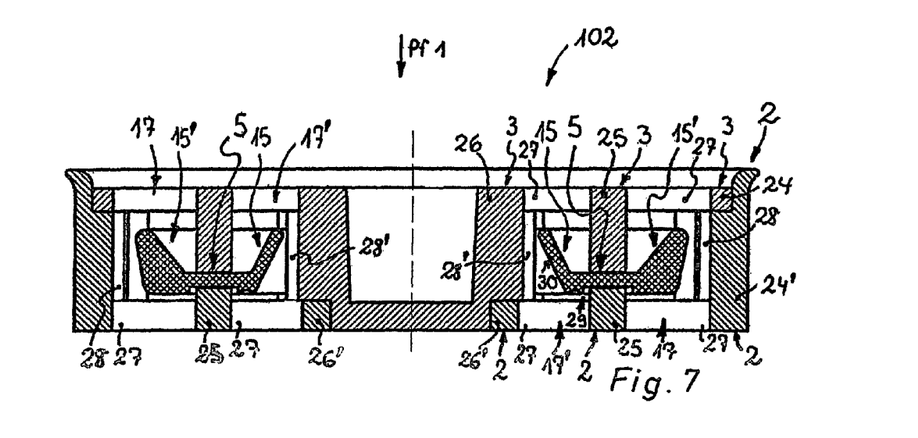

For example, at the housing seal 5 of the insertable components 100, 102 shown in the FIGS. 4 and 7, one geometrically soft and one oppositely stiff lip are provided as throttle bodies 15, 15', reacting with different sensibility to the differential pressure. The throttle bodies 15, 15' having different stiffnesses control the through-flow amounts in the various pressure ranges and complement one another this way in the low pressure and the high pressure range.

For very low differential pressure, for example amounting to 0.1 bar, the geometrically soft lip embodiment, serving as a throttle body 15, contacts the control profiling and begins to reduce the free flow cross-section. The geometrically stiff lip 15' does not deform, which allows the free cross-section of this area to be fully available for the flow of the fluid. By the large geometrical elasticity of the lip embodiment 15, the shape is deformed very rapidly into the control profiling by any rising pressure, i.e. in the range up to 0.4 bar, and ultimately seals the free cross-sections available here. When the pressure further increases, the stiff lip formation, serving as a throttle body 15', deforms as well and thus maintains a constant through-flow in the high pressure range.

Figure 6:
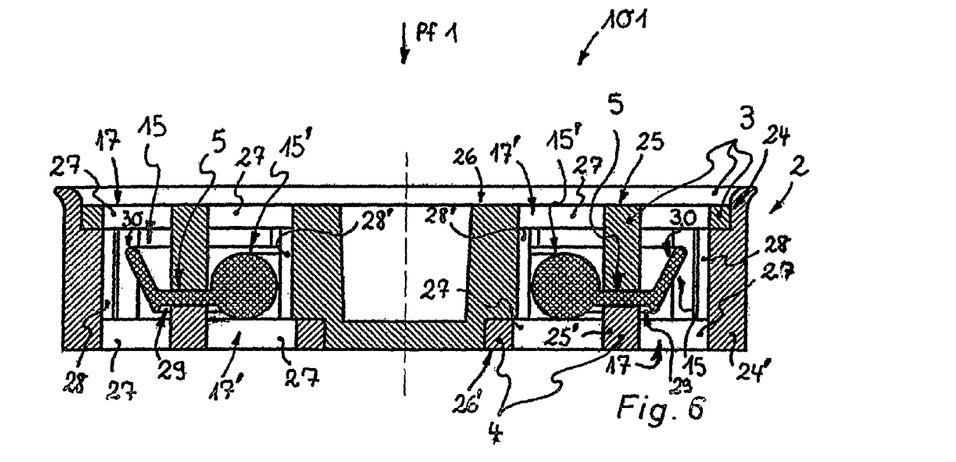
Figure 8:
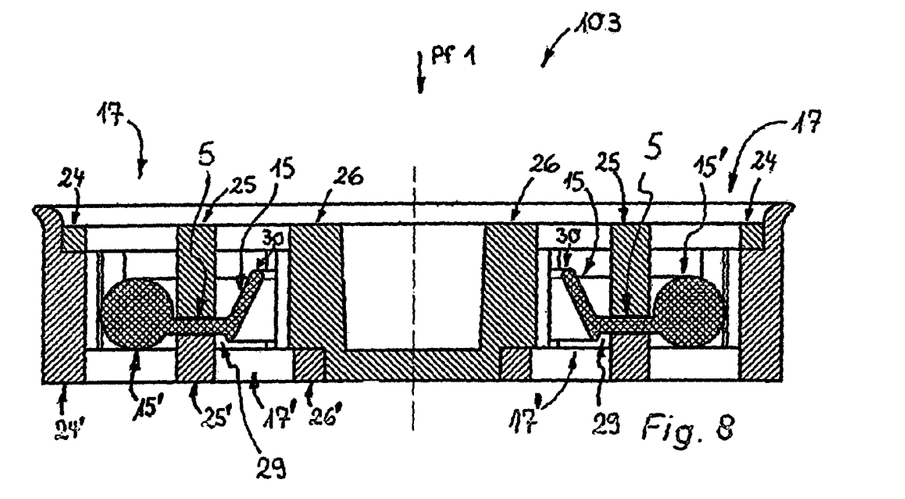

In the insertable components 101 and 103, shown in FIGS. 6 and 8, the lip-shaped throttle body 15 reacts to comparatively low differential pressure, while the stiffer O-ring shaped throttle body 15' becomes active at higher differential pressure.

This way, the characteristic line of the through-flow regulator shown here achieves a through-flow target value at a very low pressure and maintains it constant up to the high pressure range at approx. 10 bar, for example.

In order to control the reaction behavior of the individual throttle bodies 15, 15', the control motion of these throttle bodies can be limited by a control stop. While the connection bars 27 serve as downstream throttle-body supports for the O-ring shaped throttle bodies 15' of the insertable components 101 and 103, the connection bars 27 serve as control stops for the lip shaped throttle bodies 15, 15'. For this purpose, the lip-shaped throttle bodies 15, 15' are provided with a lip section 29 aligned approximately laterally to the through-flow direction, which cooperates with its downstream surface with the adjacent control stop and which extends into a free lip end region 30, aligned diagonally in a direction opposite the through-flow direction.

The through-flow controllers 100, 101, 102, and 103 shown in two steps in FIGS. 4 through 8 can be sorted into two types with 2 variations each: while in the first type according to FIGS. 4 and 7 the throttle bodies 15, 15' are embodied as differently reacting lip embodiments, in the second type according to FIGS. 6 and 8 one throttle body 15 is embodied lip shaped and another throttle body 15' is embodied O-ring shaped.

The two variants of these two-step types of through-flow regulators differ from each other in which throttle body 15, 15' is active towards the inside and which one is active towards the outside.

Figure 5:
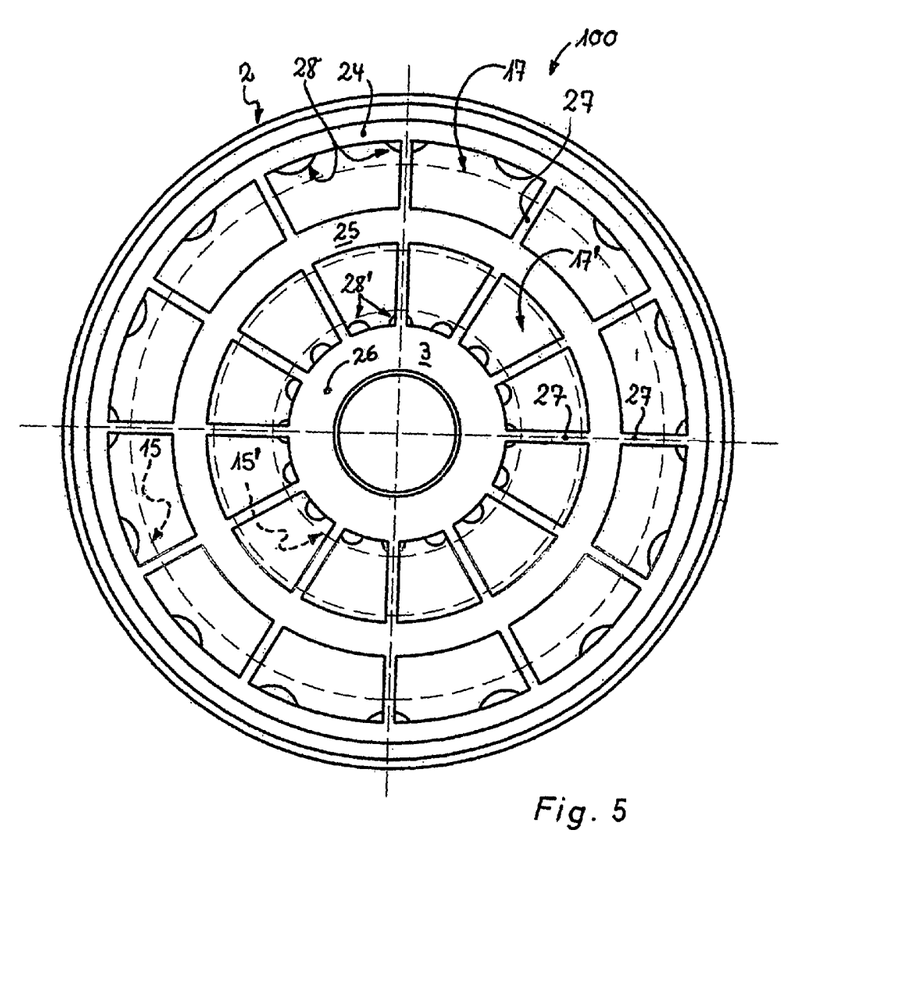

In the through-flow regulator 100 shown in FIGS. 4 and 5, the geometrically stiff and the geometrically soft lip embodiment 15, 15' are connected to one another by the circumferential housing seal 5. The housing seal 5 is fixed in its position by the annular housing walls 25/25' of the upper housing part 3 and the lower housing part 4. The annular housing walls 25, 25' and the housing seal 5 are adjusted to one another such that the control gaps 17, 17', allocated to the throttle bodies 15, 15', are separated from one another in a water-tight manner. For this purpose, one of the annular walls 25, 25' can be provided with a circumferentially raised sealing bar, which is pressed into the housing seal 5. The embodiment of the housing parts 3, 4 in the area of the downstream connection bars 27 determines if any distance remains between the throttle bodies 15, 15' and the downstream connection bars 27 and to what extent, which also serve as control stops.

The connection bars 27 serving as control stops and their distance from the throttle bodies 15, 15' influence the control behavior of the insertable components shown here; in the flow of the fluid the lip-shaped throttle bodies 15, 15' deform relatively easy at the beginning, until the bottom of the lip contacts the connection bars 27 of the housing 2. When this state has been reached, the lip-shaped throttle bodies 15, 15' deform to a lesser extent under increasing differential pressure so that the free cross-sections are not closed as fast under high pressure. The interior control profiling 28' is provided at the housing wall formed by the annular walls 26/26'. In contrast thereto, the housing wall formed by the annular walls 24/24' is provided on its interior wall with the exterior control profiling 28, which forms the respective control profile for the geometrically soft lip embodiment 15 shown in FIG. 4.

At the interior annular wall 26, 26' of the central housing embodiment, the first housing part 3 engages a central recess 31 of the second downstream housing part 4.

In reference to the through-flow regulator 100 shown in FIGS. 4 and 5, the insertable component 102 differs in FIG. 7 merely by the arrangement of its geometrically stiff lip embodiment and its soft one. In the insertable component 101 shown in FIG. 7 the geometrically stiff, lip-shaped throttle body 15' is provided on the outside, while the geometrically soft lip-shaped throttle body 15 is arranged on the inside. The lip-shaped throttle body 15', supported in the exterior control gap 17, seals a larger surface during deformation radially outward than the lip-shaped throttle body 15 affecting the interior radius. This way, the arrangement of the lip-shaped throttle body 15, 15' on the inside or the outside affects the reaction behavior of these insertable components.

While in FIG. 6 the lip-shaped, softer throttle body 15 affects the exterior control gap 17 and the O-ring shaped, stiffer throttle body 15' is located inside the control gap 17', the O-ring shaped throttle body 15' is arranged in the exterior control gap 17 in the insertable component 103 shown in FIG. 8 and the lip-shaped, softer throttle body 15 is arranged in the interior control gap 17', in contrast thereto.

The embodiment of the through-flow regulator 100, 101, 102, and 103 shown here and the reaction behavior of these insertable components can be varied and influenced constructively by the geometrical stiffness of the soft and the stiff lip embodiment 15, 15', by the elastic characteristics of the material used, by the distance of the throttle bodies 15, 15' on the one hand and the downstream provided control stops, on the other hand, by the dimensions of the control gap 17, 17' remaining between the throttle body and the adjacent housing wall, by the control profiling 28, 28' provided at the adjacent housing wall, and by the arrangement of the sensitively reacting throttle body in the area of the interior and the exterior control gap 17, 17'.

The insertable components 1, 10, 100, 101, 102, and 103, as discernible from FIGS. 1 through 8, can be composed from as little as three parts and are characterized by their simple production, their compact design, as well as their low construction height.

The invention claimed is:

1. A through-flow regulator that is insertable into a gas or liquid line, comprising a housing (2), with at least one throttle or regulating body (15, 15') being arranged inside said housing, defining a control gap (17, 17') between the throttle or regulating body and a housing wall (24, 26), at least one housing wall (16), limiting the control gap (17, 17'), is provided with a regulating profiling (24; 28, 28'), in the form of ribs or grooves, extending in a through-flow direction (Pf1), with the control gap changing depending on pressure to regulate flow in the flow-through direction, the housing (2) is comprised of at least two housing parts (3, 4) and between the facing sides of two housing parts (3, 4), a housing seal (5) is provided, which is integrally connected in one piece to the at least one throttle body or regulating body (15, 15') supported inside the housing, wherein the at least one throttle body (15, 15') is lip-shaped and is aligned with a free lip end region (30) thereof extending diagonally opposite the through-flow direction (Pf1).

2. The through-flow regulator according to claim 1, wherein the throttle body (15) is mounted in a housing chamber between the upstream and the downstream housing part (3, 4) and the downstream housing part (4) is provided with an interior housing wall (24') forming a limit of the control gap or a similar rest for the annular throttle body (15.)

3. The through-flow regulator of claim 1, wherein the at least one throttle body (15, 15') is lip-shaped.

4. The through-flow regulator according to claim 1, wherein a control motion of the at least one lip-shaped throttle body (15, 15') is limited by a control stop.

5. The through-flow regulator according to claim 4, wherein the at least one lip-shaped throttle body (15, 15') comprises a lip section, aligned approximately lateral to the through-flow direction (Pf1), which extends into the free lip end region (30) aligned opposing the through-flow direction (Pf1.)

6. The through-flow regulator according to claim 5, wherein the lip section (29), approximately aligned lateral to the through-flow direction (Pf1), cooperates with the control stop.

7. The through-flow regulator according to claim 1, wherein at least one of the housing parts (3, 4) comprises at least two approximately concentric annular walls (24, 25, 26; 24', 25', 26') connected via approximately radial connection bars (27).

8. The through-flow regulator according to claim 7, wherein at least one of the connection bars (27) arranged downstream of the throttle body (27) is embodied as a control stop and/or as a throttle body support.

9. The through-flow regulator according to claim 1, wherein the housing parts (3, 4) are provided with annular surfaces, facing one another, between which the housing seal (5) is clamped.

10. The through-flow regulator according to claim 1, wherein a central housing portion of a first housing part (3) engages a central recess (31) of a second housing part (4.)

11. The through-flow regulator according to claim 1, wherein the housing seal (5) is connected on both sides to at least one throttle body (15, 15'), said throttle bodies (15, 15') are each supported on the inside of said housing (2) in a respective control gap (17, 17').

12. The through-flow regulator according to claim 11, wherein the housing walls (25, 25') clamping the housing seal (5) on faces therebetween separate the control gaps (17, 17') allocated to the throttle bodies (15, 15').

13. A through-flow regulator that is insertable into a gas or liquid line, comprising a housing (2) formed of at least two housing parts (3, 4) and between facing sides of the two housing parts (3, 4), a housing seal (5) is provided, which is integrally connected in one piece to throttle or regulating bodies (15, 15') supported inside the housing, with the throttle or regulating bodies (15, 15') defining control gaps (17, 17') between the throttle or regulating bodies and housing walls (24, 26), with the control gaps changing depending on pressure, the housing seal (5) is connected on each of its sides to respective ones of the throttle or regulating bodies (15, 15'), said throttle bodies (15, 15') are each supported at a respective one of the control gaps (17, 17'), and the throttle bodies (15, 15') provided on both sides of the housing seal (5) react to different differential pressures and, on the one hand, the first throttle body (15) reacts in a low pressure range and that, on the other hand, the second throttle body (15') reacts in a high pressure range.

14. A through-flow regulator that is insertable into a gas or liquid line, comprising a housing (2) formed of at least two housing parts (3, 4) and between facing sides of the two housing parts (3, 4), a housing seal (5) is provided, which is integrally connected in one piece to throttle or regulating bodies (15, 15') supported inside the housing, with the throttle or regulating bodies (15, 15') defining control gaps (17, 17') between the throttle or regulating bodies and housing walls (24, 26), with the control gaps changing depending on pressure, the housing seal (5) is connected on each of its sides to respective ones of the throttle or regulating bodies (15, 15'), said throttle bodies (15, 15') are each supported at a respective one of the control gaps (17, 17'), and the throttle bodies (15, 15') comprise different designs, each adapted to a different reaction pressure.

15. The through-flow regulator according to claim 14, wherein the throttle body (15) on one side of the housing seal (5) is lip-shaped and, the throttle body (15') on an other side of the housing seal is embodied as an O-ring.

16. The through-flow regulator according to claim 14, wherein the throttle body (15, 15') connected on each side of the housing seal (5) is lip-shaped.

17. The through-flow regulator according to claim 14, wherein the throttle body (15) reacting in a low pressure range is allocated to an exterior control gap (17).

18. The through-flow regulator according to claim 14, wherein the housing seal (5) and the throttle bodies (15, 15') connected thereto are formed as a multi-component die-cast part and the throttle bodies (15, 15') are made from different elastomers.

19. The through-flow regulator according to claim 14, wherein the throttle body (15) reacting in a low pressure range is allocated to an interior control gap (17').

* * * * *